United States Patent [19]

Casey

[11] 4,025,946
[45] May 24, 1977

[54] METHOD AND APPARATUS FOR GENERATING GRAPHIC DESIGNS

[76] Inventor: Susan D. Casey, 243 W. 72nd St. No. 7, New York, N.Y. 10023

[22] Filed: Mar. 22, 1976

[21] Appl. No.: 669,261

[52] U.S. Cl. .................................................. 358/81
[51] Int. Cl.² ........................................ H04N 9/02
[58] Field of Search ................. 178/6.8; 358/81, 82

[56] References Cited

UNITED STATES PATENTS

| | | | |
|---|---|---|---|
| 3,710,011 | 1/1973 | Altemus | 358/82 |
| 3,747,087 | 7/1973 | Harrison | 178/6.8 |
| 3,846,826 | 11/1974 | Mueller | 358/81 |

Primary Examiner—Howard W. Britton
Attorney, Agent, or Firm—William J. Clemens

[57] ABSTRACT

A method of generating graphic designs from a light source by scanning the light source to generate a video signal, generating signals representing parameters of a raster signal and generating a raster signal from the parameter signals. The method further includes the steps of generating a modified video signal from the video signal and the raster signal, displaying the modified video signal as a visual display and reproducing the visual display as the graphic design. The system for performing the method includes a light box which is scanned by a television camera to generate the video signal. A special purpose computer is programmed with the parameters for defining the size, shape, position and structure of a raster signal which is then generated. The video signal and the raster signal are combined by the computer to generate the modified video signal to a display means such as a cathode ray tube. A still camera is utilized to photographically record the displayed signal as the graphic design.

15 Claims, 7 Drawing Figures

METHOD AND APPARATUS FOR GENERATING GRAPHIC DESIGNS

BACKGROUND OF THE INVENTION

1. Field of the Invention

This invention relates to a method and a system for generating graphic designs utilizing a raster pattern.

2. Description of the Prior Art

The prior art raster pattern generation and display systems may be broken into two groups. The first group includes systems which scan an original pattern and generate video information for display, storage or control purposes. U.S. Pat. No. 3,790,704 discloses a pattern control system for controlling textile machinery. In one embodiment, a television camera views an original pattern and generates a video signal therefrom. The video signal is displayed on a cathode ray picture tube as a monochromatic half-tone image. Superimposed upon the half-tone image is pattern stitch information which has been stored in a memory. Therefore, correspondence between the stored information and the original pattern can be determined. The stored information is utilized to control a circular knitting machine. In another embodiment, a keyboard encoder and address means is utilized to generate and store the pattern stitch information which is displayed.

The second group of raster pattern generation and display systems includes systems which store patterns or portions of pattern which are displayed in predetermined blocks along the scan lines. Each block comprises a plurality of horizontal and vertical dot positions. Additional circuitry provides means for generating patterns which are not stored.

SUMMARY OF THE INVENTION

The present invention involves the generation of unique graphic designs by selectively modifying a video signal. A television camera scans a source of radiant energy, typically monochromatic light, to generate a video signal. The video signal is applied to the input of a special purpose analog computer which provides for the selective modification of the video signal in terms of intensity, color, and horizontal, vertical and depth distortion. The modified video signal is then applied to a cathode ray tube to generate a visual display as a graphic design. The display can be photographically reproduced for use as an art object, fabric design, wall or floor covering patterns and the like.

The above-discussed prior art does not contemplate the generation of a design by distorting or shaping the raster which is combined with the video signal for display. In the present invention, a plurality of signals representing parameters of a raster are generated from preselected inputs. The raster is then generated according to the selected parameters which define its shape, size, position and structure. The video signal from the camera and the raster are combined to form a modified video signal which is displayed as an image in one frame on a cathode ray tube or a similr device. Color can be added to the modified video through the use of a color encoder which assigns red, green and blue color component values to selected levels of gray tones.

The standard television raster signal is defined by horizontal and vertical raster signals which control the sweep of a trace on a cathode ray tube. The raster can be distorted or shaped by superimposing signals representing desired raster parameters on the horizontal and vertical raster signals. The parameter signals modify the standard raster signal in terms of length of lines, spacing between lines, the position at which the trace starts, overall size or depth and deviations from a straight raster line. Furthermore, the raster can be divided into sections each one of which can be individually distorted or shaped.

BRIEF DESCRIPTION OF TH DRAWINGS

DESCRIPTION OF THE PREFERRED EMBODIMENT

Figure 1:
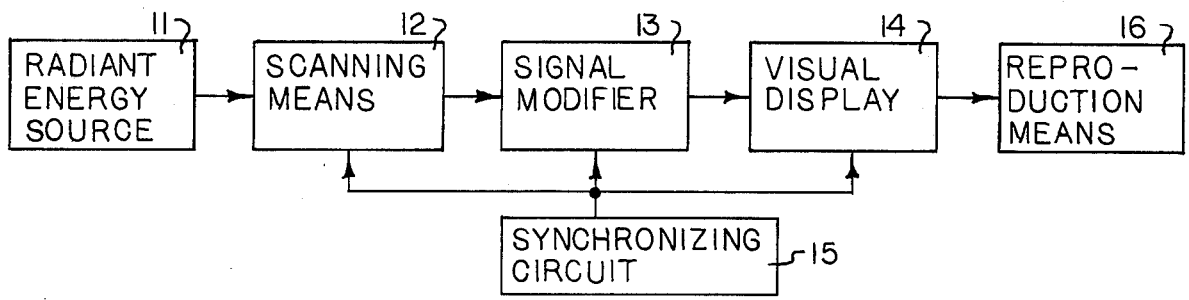
FIG. 1 is a block diagram of a system for generating graphic designs according to the present invention.

There is shown in FIG. 1, a block diagram of a system for generating graphic designs according to the present invention. A source of radiant energy is scanned by a scanning means 12 which generates a scan position versus time analog video signal having a magnitude representing the intensity of the radiant energy from the source 11. The video signal is applied to a signal modifier 13 which changes the intensity versus time relationship of the video signal to generate an output signal to a display 14. A synchronizing circuit 15 generates signals to the scanning means 12, the signal modifier 13 and the display 14 to synchronize the timing of the video signal throughout the system. The output signal which is generated as an image on the display 14 represents a unique graphic design which is then transferred to a more permanent form by a reproducing means 16.

Figure 2:
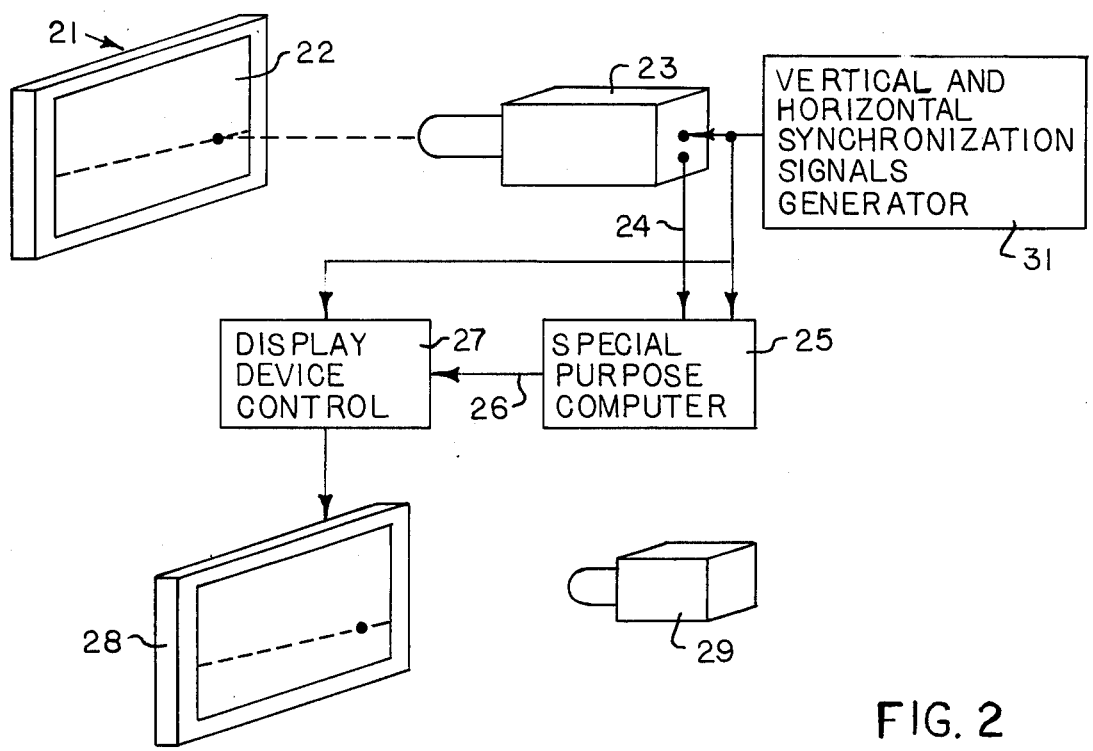
FIG. 2 is a more detailed part block diagram-part schematic of the system of FIG. 1.

In FIG. 2, there is shown a more detailed part block diagram-part schematic of the system of FIG. 1. A radiant energy source, such as a light box 21, provides a source of white light at a screen surface 22. A television camera 23 is provided as a means for scanning the screen surface in a predetermined pattern to generate an analog video signal on a line 14 to a signal modifier which advantageously can be a special purpose computer 25. The computer 25 can be programmed to generate a modified analog video signal on a line 26 to a display device control 27. The control can be a television receiver which generates a visual display of the modified video signal on the face of a cathode ray tube (CRT) display 28. When the display scan is complete, it is reproduced photographically by a still camera 29.

A synchronizing circuit or vertical and horizontal synchronization signal generator 31 supplies sync signals to the camera 23, the computer 26 and the control 27 such that the scan of the display 28 is synchronized with the scan of the light box screen surface 22. In the alternative, the generator could superimpose the sync signals on the video signal from the camera 23 to be used by the computer 25 and the control 27 or the computer 25 could generate the sync signals to the camera 23 and the control 27 to synchronize the respective scans.

If the camera 23 generates the standard television signal employed in the United States, the image generated on the CRT 28 will have a width to height ratio of 4:3. The scanning sequence when looking at the face of the CRT starts in the upper left-hand corner and travels at a uniform rate from left to right along lines that are spaced apart at a constant distance. When the end of a line is reached, the scanning spot quickly returns to the left to start a new line during which time the spot is blanked out. As the scanning spot travels back and forth across the face of the CRT, it also moves downwardly at a constant rate such that each line is slightly sloped and begins slightly lower than the end of the previous line. When the bottom of the picture is reached, the scanning spot quickly returns to the top of the picture while maintaining the horizontal motion previously described. However, the spot is blanked out during this return.

The scanning spot requires 1/60th of a second to travel from the top to the bottom of the picture and back again. During this time one field of 262.5 lines has been traced. Now a second field is traced wherein the lines lie between the lines of the first field such that the two fields are interlaced. The two fields of lines are called a raster and the intensity along each line is varied to form an image or picture. The complete picture comprises 525 lines which have been traced in 1/30th of a second and is called a frame. Interlacing makes it possible to avoid noticeable flicker while using the lowest repetition frequency for the picture that will satisfactorily portray motion.

In the standard television picture, the blanking pulses for the horizontal retrace are allocated sixteen percent of the time available for scanning one line or about ten microseconds. Thus, the scanning spot moves from left to right in 53.5 microseconds. Similarly, the vertical blanking pulses occupy between 7 and 8% of the total field time, or about 1250 microseconds. After subtracting the blanking times, the number of active lines in the picture is approximately 485.

Synchronization between the scanning operations at the camera 23 and at the CRT 28 is accomplished with horizontal and vertical synchronization pulses from the generator 31. These pulses can be supplied to the camera 23, the computer 25 and the control 27 on separate lines as shown in FIG. 2, or they can be modulated on the video signal generated by the camera as is the case with a radiated carrier wave. The standard horizontal sync pulses are five microseconds long and are superimposed on the horizontal blanking pulses. The standard vertical sync pulses are equal to the time required for three lines or approximately 19 times the length of the horizontal sync pulses. Horizontal synchronization is maintained during the presence of the vertical sync pulses by serrations that break up the vertical sync pulse into six blocks. These serrations have twice the line frequency and are so timed that the rise of every other serration occurs at the instant the horizontal sync pulse would have risen in amplitude if it had been present. The standard signal is modulated on a carrier where black is represented by an amplitude that is 75% of the maximum envelope amplitude and white corresponds to an amplitude of about 12½ % of the maximum. The blanking pulses correspond to black and synchronizing pulses occupy the range between 75 and 100 % of the maximum envelope amplitude.

If the video signal is to be in color, additional information must be generated to define the red (R), blue (B) and green (G) components. These components need not be transmitted as separate signals, but can be any three independent combinations of them. A general form of the three signals of a standard color video signal is:

$$E(Y) = a_1 E(G) + a_2 E(R) + a_3 E(B)$$
$$E(I) = b_1 E(G) + b_2 E(R) + b_3 E(B)$$
$$E(Q) = c_1 E(G) + c_2 E(R) + c_3 E(B)$$

where the $a$'s, $b$'s and $c$'s are numerical constants.

Figure 3:
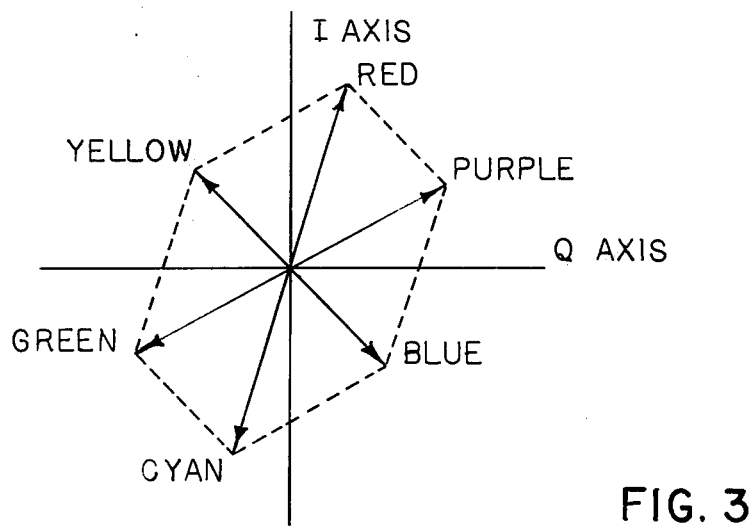
FIG. 3 is vector diagram for various saturated colors in a color television signal.

The a's are chosen so as to weigh each of the three primary colors in proportion to its contribution to the brightness of the picture. Thus, $E(Y) = 0.59E(G) + 0.30E(R) + 0.11E(B)$ where $E(Y)$ is called the luminance signal and is identical with the video signal of a conventional monochrome television system. The signals $E(I)$ and $E(Q)$ indicate the way the color of the picture departs from shades of gray, and are called chrominance or color-difference signals. It has been found that the most desirable result for television is obtained when $E(I) = -0.28E(G) + 0.60E(R) - 0.32 E(B)$ and $E(Q) = -0.52 E(G) + 0.21 E(R) + 0.31 E(B)$. By simultaneous solution, the color signals are defined as:

$$E(G) = E(Y) - 0.28E(I) - 0.64 E(Q)$$
$$E(R) = E(Y) - 0.96 E(I) + 0.62E(Q)$$
$$E(B) = E(Y) - 1.10 E(I) + 1.70 E(Q)$$

where $E(K)$ and $E(Q)$ can be represented by a single vector $E(C)$ on a complex plane where $E(C) = E(Q) + E(I)$. The direction of the vector denotes the color or hue of the luminance signal and the length of the vector indicates the intensity of the color. This relationship is shown in FIG. 3 where the vector lengths correspond to saturated colors. The I-axis ranges from saturated orange through unsaturated oranges to white $E(I) = 0, E(Q) = 0$) and then through unsaturated bluish cyan to saturated bluish cyan. Along the Q-axis, the color ranges from saturated bluish purple to white to saturated yellow-green. For a more detailed explanation of television systems see Glenn M. Glasford, "Fundamentals of Television Engineering, " McGraw-Hill Book Company, Inc., New York, 19.55.

The video signal from the camera 23 on the line 24 is modified by the computer 25 according to a predetermined set of parameters to creat a desired change. A computer suitable for preforming the desired modifications is disclosed in U.S. Pat. No. 3,747,087 issued to Lee Harrison, III et al. on July 17, 1973 which is incorporated herein by reference. There is shown a system for producing animation sequences of scenes and having an analog portion for generating output signals representing one or more sections of a raster on which images viewed by a video camera can be produced. Analog inputs to the analog portion define the structure size, shape, location, orientation and other parameters of the raster section to effectively define the shape of each part of the viewed image produced thereon. By varying the analog inputs, the raster section parameters can be made to vary, thus imparting motion to the image. However, if the analog signals are set to the desired values and maintained there, a modified video signal is generated which represents a unique design. If the design is displayed and transferred to a more permanent form, it can be utilized in numerous ways such as an art object, on furniture fabric, on clothing, on rugs and on floor tile.

Figure 4:
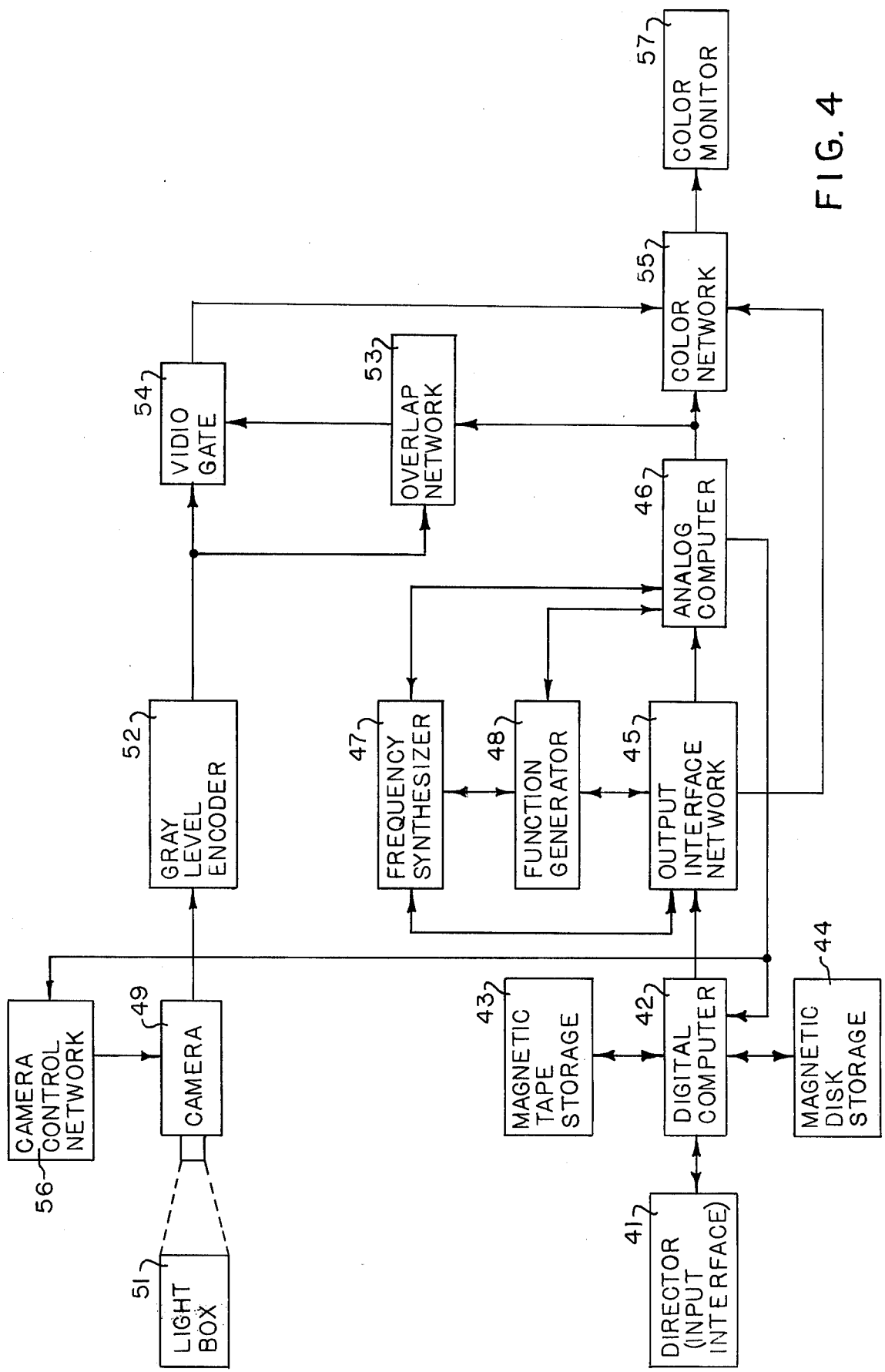
FIG. 4 is a more detailed block diagram of the system represented in FIGS. 1 and 2.

FIG. 4 shows a simplified block diagram of the system disclosed in the above-referenced U.S. Pat. No. 3,747,087. A director 41 or input interface generates analog and digital signals defining each parameter of each raster section for the frame to be generated. The values of these signals are set with analog controls, such as potentiometers, and digital parameter or channel select controls, such as multiposition switches, which determine the parameters being defined and which will be discussed subsequently. The analog signals from the director are converted to digital signals and are sent to a digital computer 42 for storage in either a magnetic tape storage device 43 and/or a magnetic disk storage device 44. When it is desired to generate a display, the computer 42 sends the stored information to an interface network 45 which contains a plurality of interface units. Some of these units convert the digital parameter data from the digital computer 42 into analog parameter signals and transfer these signals to an analog computer 46. Digital data from other interface units of the network 45 is sent to a frequency synthesizer 47 to define a frequencies of modulation signals utilized for producing certain animation effects. Digital data from still other interface units of the interface network 45 are sent to a function generator 48 for defining the phase, wave form, amplitude, and synchronization mode of the modulation signals which are generated by the function generator to the analog computer 46.

The analog computer 46 responds to the inputs from the interface network 45, the frequency synthesizer 47 and the function generator 48 to generate output signals defining raster sections. Thus, such parameters as the structure, shape, size and position of each raster section generated by the computer 46 are defined by the control settings of the director 41.

Also included in the system is a video camera 49 which is positioned to scan a light box 51 which is typically a source of monochromatic or white light. The video signal generated by the camera 49 is sent to a gray level encoder 52, which can be the encoder described in U.S. Pat. No. 3,710,011 issued on Jan. 9, 1973 to William C. Altemus et al. The encoder 52 produces a video signal at its output representing the scanned light box image in discrete shades of gray. An overlap network 53, which can be of the type described in U. S. Pat. No. 3,364,382 issued on Jan. 16, 1968 to Lee Harrison III, receives the analog computer output signals and the encoder output signals and blanks portions of the generated image appearing behind other portions of the image, if desired. The output signal from the encoder 52 is sent through a video gate 54 to a color network 55. The gate 54 is opened by the overlap network 53 only when image information is being generated over an area not previously covered with other image formation. Therefore, the video signal appearing at the color network 55 represents the scanned image in discrete shades of gray which has been compensated for overlap prevention. The video signal can be utilized to reproduce the image on the raster sections generated by the analog computer 46.

The analog computer 46 generates horizontal and vertical reset pulses from signals received by it from the frequency synthesizer 47 to the digital computer 42 and a camera control network 56 to synchronize the generation of the analog computer output signal with the generation of the analog video signal by the camera 49. The analog computer output signal, the analog video signal from the video gate 54 and signals from the output interface network 45 defining the red, green and blue components of each gray shade are applied to the color network 55. The network is disclosed in the referenced U.S. Pat. No. 3,710,011 and generates a modified video signal which may be displayed on a color monitor 57.

A schematic diagram of the analog computer portion disclosed in U.S. Pat. No. 3,747,087 is shown in FIGS. 4 and 4A of that patent. The analog computer generates X and Y coordinate signals for generating a raster section the parameters of which are defined by various input signals. For example, there are input signals to define the X and Y position of a raster section relative to the other raster sections, to define the horizontal size or length of the raster lines to define the vertical size or spacing between the raster lines, to define the depth or overall size of a given raster section and to define the horizontal and vertical axes of rotation of the raster section. In addition, inputs from the function generator produce depth, vertical and horizontal modulations of the raster section. It is evident that these input signals can be varied to generate an infinite number of combinations of raster section size, shape, structure and position. If the input signals remain constant, identical raster sections will be generated repeatedly and can be displayed on the CRT as a fixed image which then is photographed according to the present invention.

The special purpose computer shown in FIG. 4 can be utilized in the system of FIG. 2 wherein the light box 51, the camera 49 and the color monitor 57 are replaced by the light box 21, the camera 22 and the control 27 and CRT 28 of FIG. 2 respectively. According to the method of the present invention, the parameters for generating a design are set at the director 41 with the director switched to the frame reference mode to establish the initial frame since animation is not desired.

The circuitry disclosed in the above-referenced patents forms the basis for the SCANIMATE System manufactured by Computer Image Corporation Denver, Colo. This system electronically animates a piece of artwork called the image according to a predetermined set of input parameters. The method according to the present invention utilizes the SCANIMATE system in an initial mode to generate a static graphic design. However, it will be appreciated that special purpose computers other than the SCANIMATE system can be utilized subject only to the limitation that they can be programmed to modify an analog video signal which is displayed as a raster.

Figure 5:
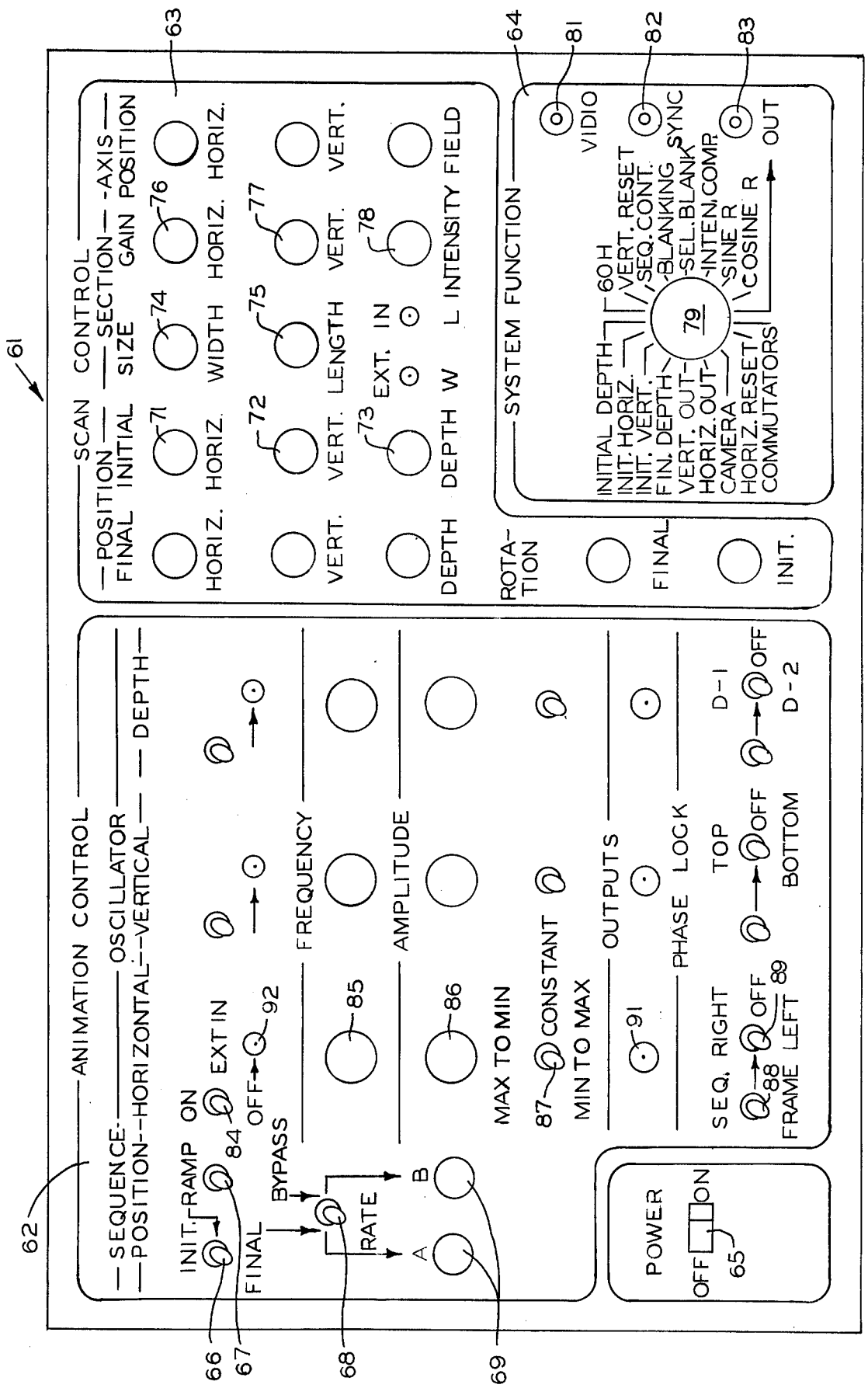
FIGS. 5 and 6 are schematic diagrams of the control console of a computer suitable for performing modifications to a video signal according to the present invention.

FIG. 5 is a schematic representation of the SCANIMATE system basic operating controls and indicators. A control console 61 includes an animation control section 62, a scan control section 63 and a system function section 64. A power switch 64 is set to the on position to connect power to the circuitry. In the animation control section 62, an initial-final switch 66 is set to the initial position to allow the input parameters to be set. If switched to the final position, the computer would initiate an animation sequence. However, the final position is not utilized for the method according to the present invention. Since an animation sequence is not generated, the position of the ramp-bypass switch 67, the rate select switch 68 and the rate potentiometers 69 are not important as they have no effect on the initial frame.

The control console 61 circuitry has three channels for controlling the display of the video signal which is generated by the scanning television camera. Two of the channels, the horizontal sweep and the vertical sweep, are utilized to define the path of the raster. In the scan control section 63, the initial position of the image to be displayed is set in the horizontal direction by a potentiometer 71 and in a vertical direction by a potentiometer 72. The horizontal sweep signal is developed from the horizontal initial position signal and a horizontal raster signal from an internal generator. The raster signal is a sawtooth which scans the CRT display back and forth across the screen while the position signal selects the position on the screen from which the trace begins. Similar signals are generated by the vertical channel to return the raster from the bottom to the top of the screen and to define the vertical position for the start of the trace.

The third channel is the depth channel having an initial depth potentiometer 73. The size of the raster and hence the size of the image is set by a width potentiometer 74 and a length potentiometer 75. The depth potentiometer generates a signal to modulate the raster generators thereby changing the size of the image which is the only way to depict distance in a two-dimensional picture.

In the scan control section 63 there is also a horizontal gain potentiometer 76 and a vertical gain potentiometer 77. These controls provide adjustment for the overall gain of the horizontal and vertical channels which include deflection amplifiers for generating the signals to be applied to the deflection plates of the CRT display. An intensity potentiometer 78 provides a control over the base intensity level of the raster which is modulated by the video signal. In the scan control section 63, other potentiometers provide control over the final position of the image and the rotation of the raster about an axis. Since these controls are not utilized in the method according to the present invention, they will not be described.

The system function section 64 includes a multiposition switch 79 and three output jacks 81, 82 and 83. The first output jack 81 supplies the intensity adjusted analog video signal for oscilloscope viewing. The second output jack 82 supplies the vertical reset sync pulse for use in synchronizing an oscilloscope to display the video signal. The third output jack 83 supplies a signal selected by the multiposition switch 79. These controls are not involved in the method according to the present invention, but could be utilized to display the various signals which cooperate to form the design. Such information could be utilized to duplicate the design on another type of analog computer or to detect malfunctions of the SCANIMATE system.

The horizontal, vertical and depth oscillators of the animation control 62 can be utilized separately or in combination to shape the raster into the desired graphic display. As way previously discussed, the horizontal channel signal comprises the horizontal raster signal superimposed on the horizontal position signal. However, a horizontal oscillator output signal may also be superimposed on the horizontal raster signal. Thus, the horizontal oscillator output signal can be utilized to shape the horizontal raster signal. If an on-off switch 84 is switched to the on position, the animation control section 62 will generate a horizontal oscillator signal which can be adjusted in frequency with a frequency potentiometer 85 and adjusted in amplitude with an amplitude potentiometer 86. During animation, the oscillator output signal amplitude can be ramped from maximum to minimum or from minimum to maximum according to the postion of a ramp select switch 87. However, for the purposes of the method according to the present invention, the ramp select swtich 87 is set to the constant position wherein the amplitude set with the amplitude potentiometers 86 is not varied.

The horizontal oscillator also includes a sequence frame switch 88. In the sequence postion, the oscillator is synchronized with the start of the animation sequence. In the frame position, the oscillator is synchronized to the video signal frame rate. Therefore, the switch 88 is set to the frame position. A second switch, a sync switch 89, is utilized to select the direction from which the oscillation is to begin. This switch is used primarily when the frame-sequence switch 88 is in the sequence position. An output jack 91 supplies the horizontal oscillator signal for monitoring purposes.

It may be desired to utilize an external signal for the horizontal oscillator signal. If the on-off switch 84 is set to the off position, an external oscillator signal can be introduced into the horizontal channel through an input jack 92.

The vertical oscillator and depth oscillator have controls which are operated in a manner similar to the controls of the horizontal oscillator. Therefore, through the use of the scan control section 63, the size, intensity and position of the image can be determined and, through the use of the animation control section, the shape of the image can be controlled. The shape is a function of the oscillator signal frequency, amplitude and wave form. For example, a sine or cosine wave form will generate a smoothly curved raster for an "organic" design while sawtooth wave form will generate angular distortions in the raster for a "geometric" design.

Figure 6:
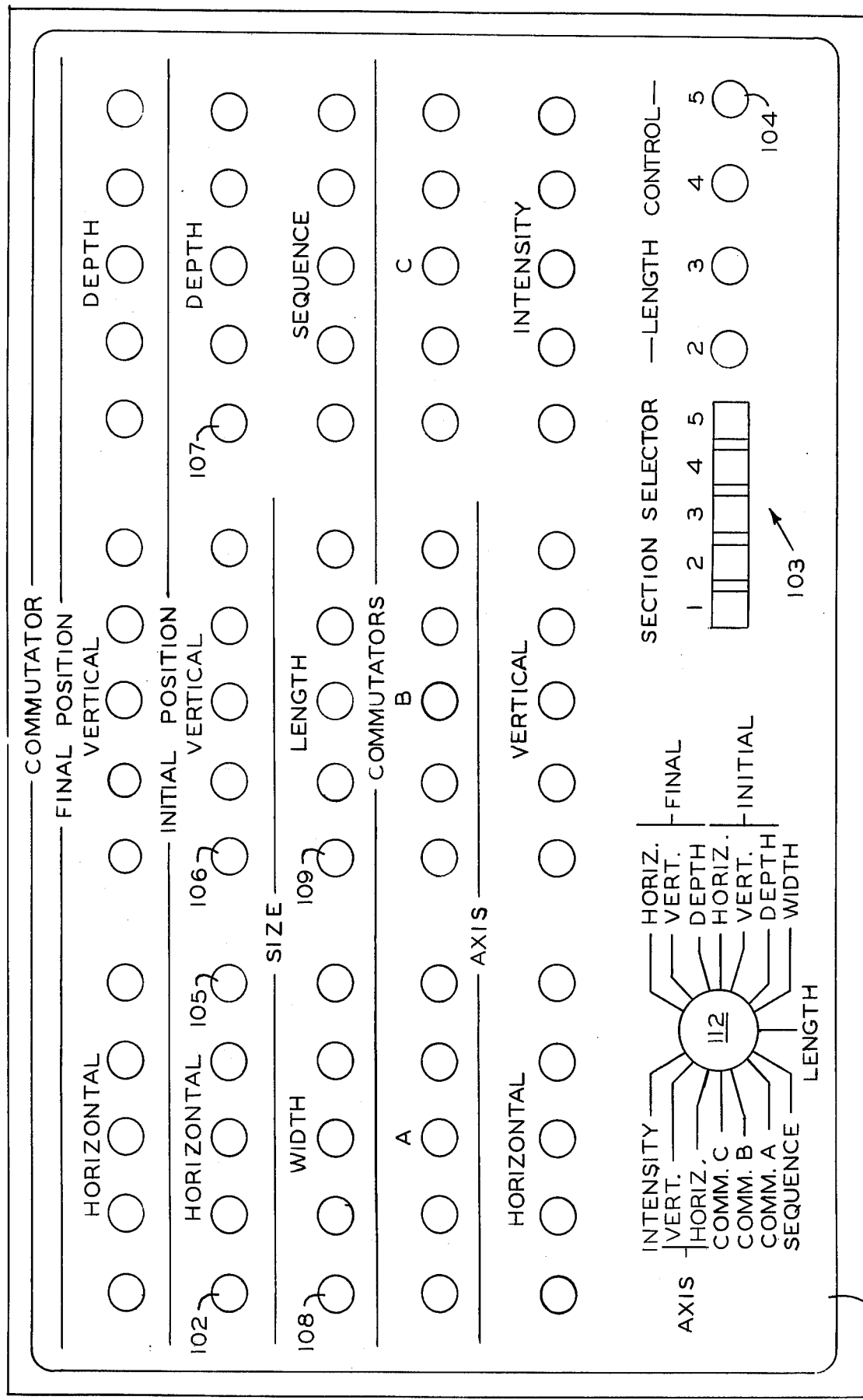

The raster can also be sectioned into as many as five separate sections each of which can be individually distorted. As shown in FIG. 6, the control console 61 also includes a commutator section 101 which can be compared with a five position, 15 pole electronic switch. When any one position of the switch is enabled, the circuit gates the associated 15 signals to inputs in the scan control section 63. For example, the commutator section includes an initial horizontal position potentiometer 102 for a first raster section. The initial horozontal position amplifier has an input for the initial horizontal position signal set on the potentiometer 71 of FIG. 5 and the initial horizontal position signal set on the potentiometer 102. The commutator section includes a five stage shift register each stage of which enables one of the five section switches. A section selector switch 103 is utilized to specify that from one to five raster sections are to be employed. The shift register is driven by four variable delay monostable multivibrators. If five sections are to be employed, for example, the section selection switch 103 enables the section five delay multivibrator which has its delay set by a length control potentiometer 104. The section five delay is triggered by the vertical reset signal and times out while the fifth stage of the shift register is set. At the end of the fifth section delay, the delay multivibrator for section four is triggered and stage five of the register is cleared. The fourth stage of the shift register is set. The shift register opens the section five switches and closes the section for switches thus changing from section five parameters to section four parameters.

Each set of switches is on until its associated delay runs out. When the section two delay runs out, the stage two of the shift register is cleared and the stage one is set to close the section one switches. The transistions from section to section can only occur at the end of a horizontal sweep and the end of the section one is triggered by the vertical reset signal which clears stage one and sets stage five. Each section of the raster can be adjusted as to the number of raster lines contained therein as long as stage one of the shift register is set before the vertical reset signal occurs.

The 15 signals generated by the commutator section 101 are represented as 15 sets of five potentiometers each. The horizontal, vertical and depth signals for the final position are not utilized since the design is not animated. The horizontal, vertical and depth signals for the initial position are utilized as parameters for the design however. The horizontal initial position is set on five potentiometers shown as potentiometer 102 for the section one through potentiometer 105 for the section five. Similarly, there is a potentiometer for each section for the vertical initial position and the depth initial position such as the potentiometers 106 and 107 respectively for the section one. The size potentiometers include a width and a length setting for each raster section. For example, a width potentiometer 108 and a length potentiometer 109 are shown for the section one. These controls allow each raster section to be positioned separately and controlled as to size.

The sequence potentiometers and the A, B and C commutators potentiometers are not utilized on the SCANIMATE system and form no part of the present invention. The horizontal and vertical axis potentiometers are utilized only with animation. The intensity potentiometers, such as a potentiometer 111 for the section one, adjust the base level intensity of the raster section.

A multiposition switch 112 selects the indicated signal to be connected to the output jack 83 of FIG. 5 when the system function section multiposition switch 79 is set to the commutators position. Thus, any signal generated in the commutator section 101 can be displayed on an oscilloscope.

Each of the raster sections defined by the settings of the potentiometers of the commutator section 101 can be individually distorted by utilizing the oscillators of the animation control section 62 in phase lock as was previously described. Thus, the background design could be created with one or more section designs overlaying it. In the alternative, the whole raster could be divided into five equal sections with the same design in each section.

The above discussion was a summary of the computer internal connections for distorting the raster. The Computer Image Corporation also manufactures an animation aid circuit which includes five oscillators, a dual multiplier, six summing amplifiers, five gain potentiometers, five bias potentiometers and a 10-by-10 patch panel. The animation aid circuit can be utilized to introduce further distortions into the raster through the patch panel.

Figure 7:
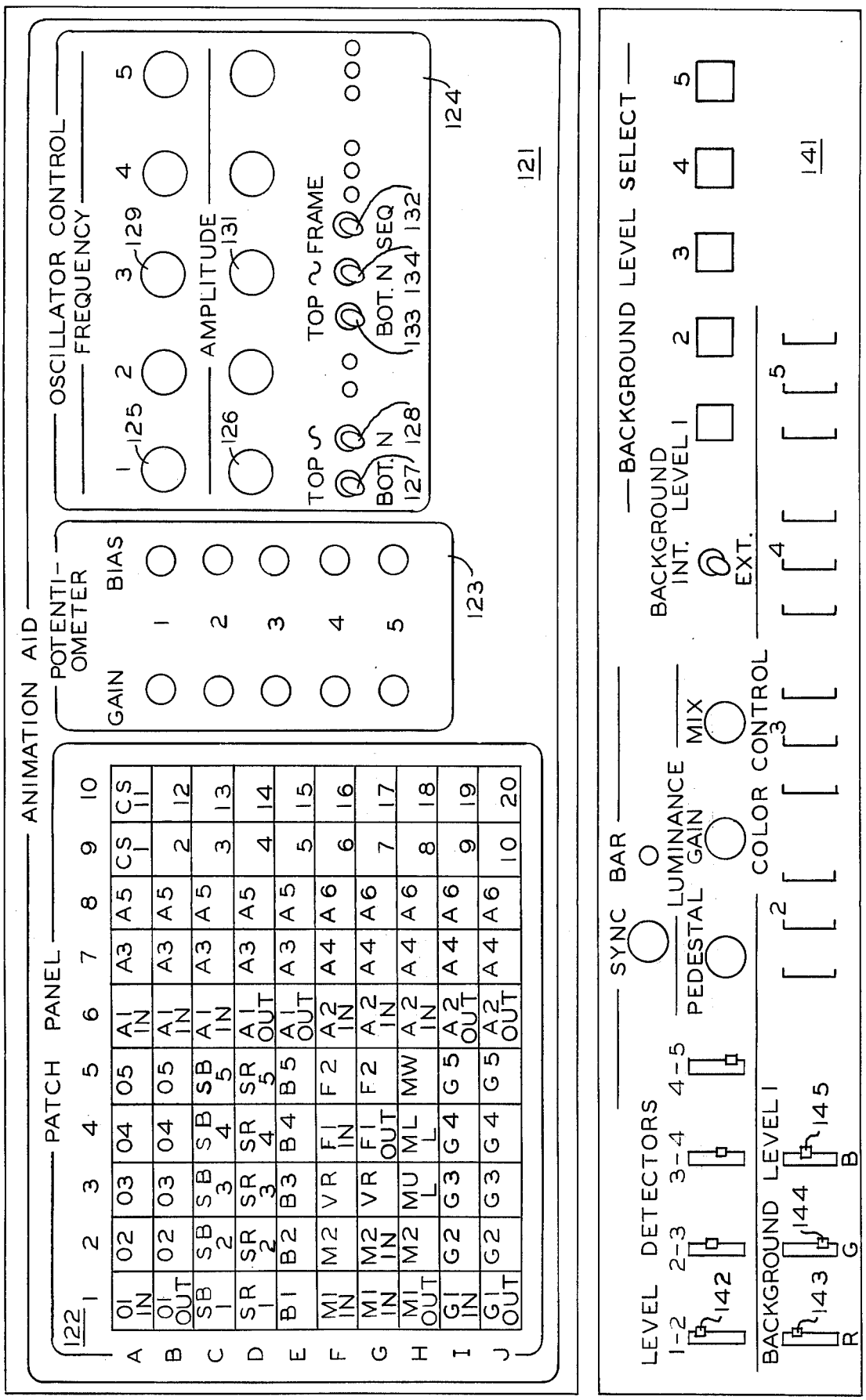
FIG. 7 is a schematic diagram of the animation aid control panel and color control console of circuits suitable for performing additional modifications to a video signal according to the present invention.

There is shown in FIG. 7 an animation aid control panel 121 including a patch panel 122, a potentiometer section 123 and an oscillator control section 124. The oscillator control section 124 includes two high frequency oscillators, numbers one and two, and three low frequency oscillators, numbers three through five. The two high frequency oscillators, approximately 90KHz, are provided for raster bending. High frequency oscillator number one has a frequency adjustment potentiometer 125 and an amplitude adjustment potentiometer 126 for defining those parameters of the wave form. This oscillator can be phase locked as could the oscillators of the animation control section 62 of FIG. 5, but is locked to a horizontal line instead of a vertical frame. Therefore, the whole raster or a selected section thereof can be shaped utilizing either of the high frequency oscillators on a line-by-line basis. A top-bottom switch 127 can be set to select the position from which the oscillation is to begin. A wave form switch 128 can be set to select either a sine-shaped or a triangle-shaped wave form. A sine-cosine switch, not located on the animation aid control panel and not shown, can be set to start a sine or a cosine wave form when the switch 128 is in the sine position. The number two high frequency oscillator has similar controls and therefore will not be discussed.

The oscillator control section 124 also includes three low frequency oscillators for raster bending. Low frequency oscillator number three has a frequency adjustment potentiometer 129 and an amplitude adjustment potentiometer 131 for defining those parameters of the wave form. This oscillator can be phase locked in either a frame or sequence mode with a frame-sequence switch 132 in a manner similar to the oscillators of the animation control section 62 of FIG. 5. If the switch 132 is set to the frame position, the oscillator can be phase locked to the top or bottom of the raster with a switch 133. There is also provided a wave form switch 134 for selecting a sine-shaped or a triangle-shaped wave form. The number four and five low frequency oscillators have similar controls and therefore will not be discussed.

The animation aid circuit includes a dual analog multiplier for multiplying one wave form by another or for use as a variable gain amplifier and six unity gain, inverting summing amplifiers for summing or inverting wave forms. Neither the multipliers nor the amplifiers have any external controls.

The potentiometer section 123 includes five gain potentiometers for the purpose of attenuating wave forms. One side of each potentiometer is connected to the system ground potential and the wiper and the other side of the potentiometer are connected to the patch panel 122. Five bias potentiometers are provided to obtain a variable d.c. voltage. One side of the potentiometer is connected to a positive potential while the other side is connected to a negative potential and the wiper is connected to the patch panel.

The patch panel 122 provides a means for externally programming the computer through an array of cherry switches (not shown). The cherry switches comprise 15 sets of five switches each wherein the sets are connected to the same inputs as the 15 sets of potentiometers of the commutator section of FIG. 6. Each cherry switch has twenty positions which are connected to the jacks labeled CS1 through CS20 respectively in columns 9 and 10 of the patch panel 122. Thus, any of the wave forms generated by the animation aid circuit can be utilized to shape any of the five raster sections.

The five oscillators each have an input labeled 01 IN through 05 IN respectively connected to the jacks in row A, columns one through five. These inputs are provided for external amplitude control by a function generator (not shown). The outputs from the oscillators are connected to the jacks in row B, columns one through five. The six summing amplifiers each have three inputs and two outputs on the patch panel. For example, the summing amplifier A1 has inputs connected to jacks in column six, rows A through C and an output connected to jacks in column six, rows D and E. The dual multiplier has independent circuits M1 and M2 each having a pair of inputs and an output connected to jacks in columns one and two rows F through H. The five bias potentimeters are labeled B1 through B5 and are connected to jacks in row E, columns one through five respectively. The five gain potentiometers are labeled G1 through G5 and have the one side connected to jacks in row I, columns one through five respectively for inputting a wave form to be attenuated and have the wiper connected to jacks in row J, columns one through five respectively for outputting the attenuated wave form. The remaining jacks on the patch panel 122 are not utilized in the method according to the present invention.

Some examples of patch panel programming are presented below with the row and column of the jack utilized designated such as (A,1) for the input to the oscillator number one.

EXAMPLE ONE

Patch the oscillator number one output (B,1) to the cherry switch number two (B,9) and set the intial position horizontal cherry switches to position two. Patch the oscillator number two output (B,2) to the cherry switch number three and set the initial position vertical cherry switches to position three. Patch the oscillator number three output (B,3) to the cherry switch number four and set the initial position depth cherry switches to four. With these external connections, the oscillators numbers one through three of the oscillator control section 124 generate horizontal, vertical and depth channel signals.

EXAMPLE TWO

Patch the oscillator number one output (B,1) to the amplifier number one input (F,1). Patch the oscillator number three output (B,3) to the other multiplier number one input (G,1). Patch the multiplier one output (H,1) to the cherry switch number two and set the initial position cherry switches to two for either horizontal, vertical or depth. The animation control section oscillators can then be utilized on the two channels which are not selected.

EXAMPLE THREE

Patch the oscillator number two output (B,2) to the multiplier number two input (F,2). Patch the oscillator number four output (B,4) to the other multiplier number two input (G,2). Patch the multiplier number two output (H,2) to the cherry switch number three (C,9) and set the cherry switches to three for either horizontal, vertical or depth. The animation control section oscillators can then be utilized on the two channels which are not selected.

In addition to the above-discussed controls for shaping or distorting the raster lines, color can be added to the final image. All of the circuitry described above only generates a design in gray tones. The previously referenced U.S. Pat. No. 3,710,011 discloses a circuit for assigning colors to each shade of gray to produce a color display.

There is shown in FIG. 7 a color control console 141 which includes level detector switches, a sync bar control, luminance controls, background level select switches and color control switches. The level detector switches are four slide switches which are utilized to generate threshold voltages for four comparators in an analog gray encoder. The video signal from the scanning camera can vary from the maximum voltage representing white to a minimum voltage representing black with infinite shades of gray in between. The threshold voltages are set to define shades of gray to which colors can be assigned. Since five levels of gray are to be defined, four switches are required such as a switch 142 for setting the threshold between shade one and shade two.

The color control switches are utilized to define the red (R), green (G) and blue (B) components of each of the five shades of gray. There are three commutators which each respond to the color component signals set by the corresponding color control switches. For example, a red slide switch 143 for the first gray level is utilized to generate a voltage representing the red component to the red color commutator. In a similar manner, a green slide switch 144 and a blue slide switch 145 are utilized to generate voltages representing the green and blue components respectively to the green and blue commutators respectively. When the first gray level video signal is detected as defined by the level detector switch 142, the red, green and blue commutators generate the color component signals selected with the color control switches 143, 144 and 145. Therefore, by adjusting the 15 color control switches, any color can be selectively and independently assigned to each of the five gray levels.

The red, green and blue color component signals are utilized to generate the graphic design in color. The liminance controls are utilized to vary the brightness of the display. The background level select switches are utilized to select the number of gray levels to be defined.

The light source of FIGS. 1, 2 and 4 can be a source of monochromatic light from white to black or can be a light box having a transparent covering on which two or more levels of gray tones are applied. Furthermore, the transparentcovering can have narrow opaque black lines which divide the raster into sections such that the raster can be distorted or shaped by a single oscillator connected to each channel to generate uniform sections without electronically sectioning the raster.

In summary, the present invention relates to a method and a system for generating a graphic design. The system includes a light source and a television camera for scanning the light source to generate a video signal. A special purpose computer includes means for setting and generating signals representing the parameters of a raster signal. The parameter signals are applied in analog form to an analog computer which generates a raster signal according to the predetermined parameters. The video signal and the raster signal are combined to generate a modified video signal which can have color components added. The color components are generated by a color encoder circuit which assigns colors to selected gray levels of the modified video signal. The modified video signal is displayed on a cathode ray tube or similar display device as an image. The image is recorded by a suitable means such as a still camera. The recorded image is a unique graphic design which can be transferred onto an object by conventional techniques which are well known in the various arts. The graphic design is abstract in that in its entirety it does not resemble a natural or man-made object.

The method of the present invention includes the steps of scanning a light source to generate a video signal, generating a plurality of signals representing parameters of a raster signal and generating a raster signal from the parameter signals wherein the parameter signals define the size, shape, position and structure of the raster signal. Further steps are the generating of a modified video signal from the video signal and the raster signal and displaying the modified video in a single frame as an image. Color components for the modified video signal can be generated to produce a color image. The displayed image is recorded as the graphic design and is transferred onto an object.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. A method for generating a graphic design comprising the steps of:
   a. scanning a light source to generate a video signal;
   b. generating a plurality of signals representing prameters of a raster signal;
   c. generating a raster signal from said parameter signals;
   d. generating a modified video signal from said video signal and said raster signal;
   e. displaying said modified video signal in a single frame as an image; and
   f. recording said image as said graphic design.

2. A method according to claim 1 wherein said light source is monochromatic.

3. A method according to claim 1 wherein said light source defines two or more levels of gray tones.

4. A method according to claim 1 wherin said light source is divided into two or more sections by contrasting opaque lines.

5. A method according to claim 1 wherein the step of generating parameter signals includes generating parameter signals defining the starting position of said raster signal.

6. The method according to claim 1 wherein the step of generating parameter signals includes generating parameter signals defining the depth of said raster signal.

7. The method according to claim 1 wherein the step of generating parameter signals includes generating parameter signals defining a distortion in one or more lines of said raster signals.

8. The method according to claim 1 including the step of sectioning said raster signal into two or more sections and the step of generating parameter signals for individually defining the lines in each of said sections.

9. The method according to claim 1 including the step of generating color component signals for said modified video signal wherein said image is color image.

10. The method according to claim 1 wherein the step of recording said image is performed by a still camera.

11. A method for generating an abstract graphic design on an object comprising the steps of:
    a. scanning a light box with a television camera to generate a video signal;
    b. generating a plurality of signals representing parameters of a raster signal;
    c. generating a raster signal from said parameter signals;
    d. generating a modified video signal from said video signal and said raster signal;
    e. displaying said modified video signal in a single frame as an image; and
    f. transferring said image onto said object as said abstract graphic design.

12. The method according to claim 11 including the step of photographically recording said image and wherein said recorded image is transferred onto said object.

13. The method according to claim 11 wherein one or more of the lines of said raster signal are distorted in response to a portion of said parameter signals.

14. A system for generating a graphic design comprising:
    a source of light;
    means for scanning said light source to generate a video signal;
    means for generating a plurality of signals representing parameters of a raster signal;
    means responsive to said parameter signals for generating a raster signal;
    means responsive to said video signal and said raster signal for generating a modified video signal;
    display means responsive to said modified video signal for generating a static visual display; and
    means for recording said visual display as said graphic design.

15. A system according to claim 14 wherein said scanning means is a television camera, said parameter signals generating means is a circuit for generating analog signals representing parameters of a raster signal, said raster signal generating means is an analog computer responsive to said analog signals, said modified video signal generating means is a color encoder, said display means is a cathode ray tube and said recording means is a still camera.

* * * * *